(12) United States Patent
Emin

(10) Patent No.: US 7,447,291 B2
(45) Date of Patent: Nov. 4, 2008

(54) NUCLEAR REACTOR AND MEANS FOR INSERTING LIQUID NEUTRON ABSORBER INTO THE CORE

(76) Inventor: Michel Emin, 44 chemin du Moulin Carron, 69130 Ecully (FR)

( * ) Notice: Subject to any disclaimer, the term of this patent is extended or adjusted under 35 U.S.C. 154(b) by 0 days.

(21) Appl. No.: 10/544,482

(22) PCT Filed: Feb. 3, 2004

(86) PCT No.: PCT/FR2004/050040

§ 371 (c)(1),
(2), (4) Date: Dec. 9, 2005

(87) PCT Pub. No.: WO2004/072984

PCT Pub. Date: Aug. 26, 2004

(65) Prior Publication Data

US 2006/0146976 A1 Jul. 6, 2006

(30) Foreign Application Priority Data

Feb. 4, 2003 (FR) .................................. 03 01242
May 6, 2003 (FR) .................................. 03 50147

(51) Int. Cl.
*G21C 7/00* (2006.01)
(52) U.S. Cl. ........................ 376/328; 376/327; 376/207; 376/203; 376/205
(58) Field of Classification Search ................ 376/207, 376/211, 215, 219, 220, 226, 231, 327, 328, 376/446, 447, 221, 203, 205
See application file for complete search history.

(56) References Cited

U.S. PATENT DOCUMENTS

| | | | | |
|---|---|---|---|---|
| 3,510,399 A | * | 5/1970 | Kotaro et al. | ................ 376/328 |
| 3,836,430 A | | 9/1974 | Frisch et al. | |
| 3,844,883 A | | 10/1974 | Bevilacqua et al. | |
| 4,076,584 A | * | 2/1978 | Golden et al. | ................ 376/229 |
| 4,702,879 A | * | 10/1987 | Tower et al. | ................ 376/282 |
| 4,793,964 A | * | 12/1988 | Fajeau | ........................ 376/294 |
| 5,057,270 A | * | 10/1991 | Chevereau | .................. 376/254 |
| 5,112,569 A | * | 5/1992 | Cinotti | ...................... 376/282 |
| 5,130,078 A | * | 7/1992 | Dillman | ..................... 376/219 |
| 5,139,735 A | * | 8/1992 | Dillmann | .................... 376/328 |
| 5,185,120 A | * | 2/1993 | Fennern | ..................... 376/219 |
| 5,227,128 A | * | 7/1993 | Kobsa et al. | ................ 376/328 |
| 2003/0138069 A1 | * | 7/2003 | Emin | ........................ 376/221 |

FOREIGN PATENT DOCUMENTS

| | | |
|---|---|---|
| DE | 11 25 562 | 3/1962 |
| EP | 0 300 745 | 1/1989 |
| FR | 2 765 722 | 1/1999 |

* cited by examiner

*Primary Examiner*—Rick Palabrica
(74) *Attorney, Agent, or Firm*—Burr & Brown

(57) ABSTRACT

A nuclear reactor including: a vessel including at least two parts; a reactor core placed in the vessel and containing fuel rod assemblies; at least one internal structure located within the vessel and having a flange portion sandwiched between the two parts of the vessel; an insertion unit for inserting a neutron-absorbing liquid in the fuel rod assemblies, placed in the vessel; and external control devices placed outside the vessel and connected to the insertion unit through conduits placed inside the internal structure, including the flange portion, wherein the insertion unit comprises a transmission unit partly placed in the conduits.

27 Claims, 15 Drawing Sheets

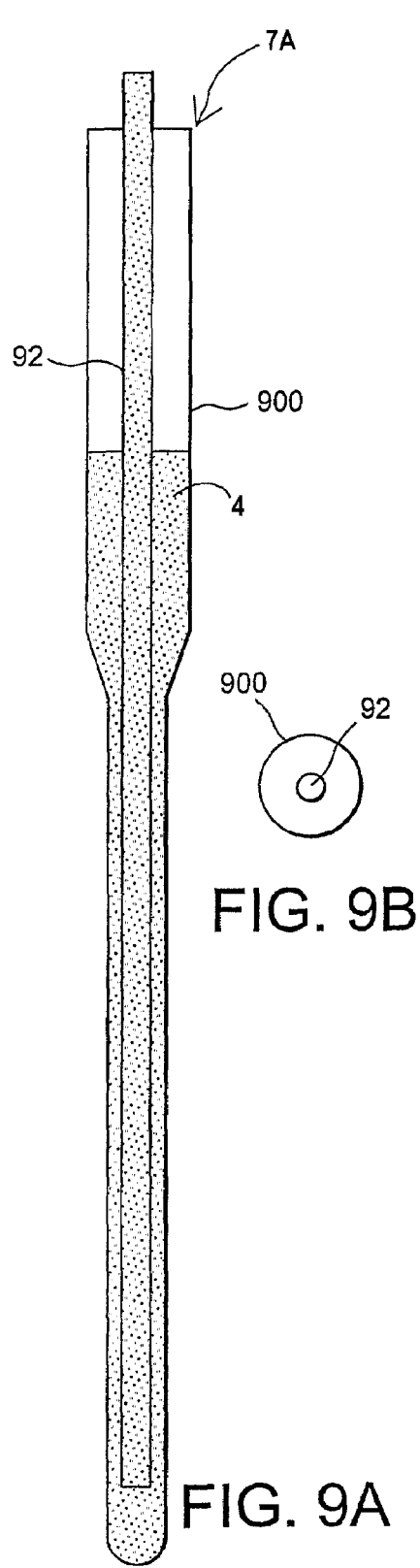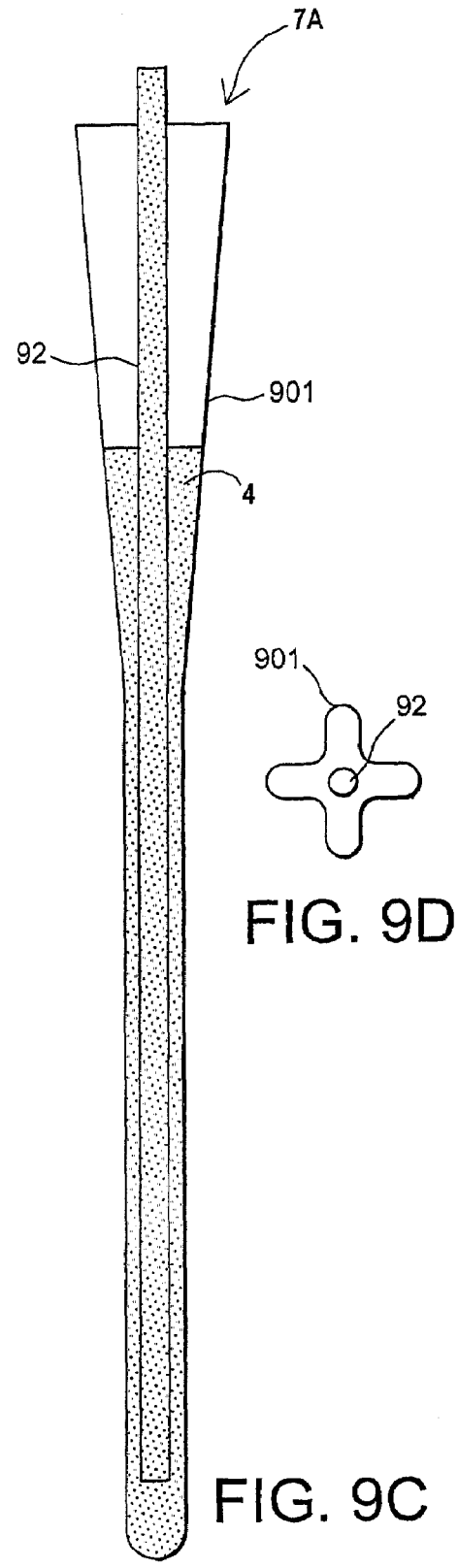
FIG. 9B
FIG. 9D
FIG. 9A
FIG. 9C

NUCLEAR REACTOR AND MEANS FOR INSERTING LIQUID NEUTRON ABSORBER INTO THE CORE

FIELD OF THE INVENTION

The invention relates to nuclear reactors, and in particular to means for inserting a neutron absorber, such as a liquid neutron absorber, when the latter is used, for controlling and modulating the instantaneous power of a nuclear reactor. More specifically, with it, it is possible to ensure emergency stopping of the latter, to modulate the flux of neutrons applied for modulating the nuclear power without any significant deformation of the core, to regenerate the operating nuclear fuel, and then to use this regenerated fuel without unloading the latter.

The invention is applied to all types of nuclear reactors, whether they are reactors with pressurized water, with boiling water, with gas coolant, with molten metals, or even with heavy water.

BACKGROUND OF THE INVENTION

FIG. 1 shows in a vertical sectional view, a first type of nuclear reactor of the pressurized water type from the prior art. Reference 1 designates, as in the other figures, the vessel of the reactor, while reference 2 designates the fuel rods which form the assembly called the core 50.

It is noted that an internal part for holding the core 50 called, in the subsequent patent application, an internal part or internal assembly referenced 10A. It is placed above the core 50 containing the fuel rods 2 and holds the fuel rods 50 into place, in the lower portion of the vessel 1, so that the vessel 1 does not move upwards under the effect of a very large water flux passing through the core 50 in an ascending movement. So this internal part or internal assembly 10A has a mechanical function.

FIG. 3 shows a boiling water type reactor according to the prior art. There again, the core 50 comprising the fuel rods 2 is placed below the internal part 10A inside the vessel 1. On the other hand, vapor dryers 36 are placed above the internal part 10A.

It is noted that in the reactors from the prior art, the internal part or the internal assembly 10A are not in contact with the outside of the vessel 2.

Stiff control rods 51 which are actuated from the outside of the vessel 1, are used in both of these nuclear reactor types, as in other types. In the case of the pressurized water reactor illustrated in FIG. 1, the control rods 51 pass through the vessel 1 through the upper lid and pass through the internal part 10A. Their control and guiding systems clutter up, inter alia, the upper portion of the lid of the vessel 1. In the case of the boiling water reactor illustrated in FIG. 3, the control rods 51 penetrate into the vessel 1 through its base and their guiding and control systems are placed under the base.

As a complement, in pressurized type reactors, it is also common to use a neutron absorber, i.e., boric acid, dissolved in the coolant flux in order to vary the reactivity homogeneously. On the other hand, varying the speed of the pumps is used for varying the reactivity in the boiling water type nuclear reactors to a lesser extent.

So it is seen that the installation required for controlling and regulating operation of the reactor's core 50 requires a large volume by virtue of the use of control rods 51, either above or below the core 50 and passing through the vessel 1, and mobilizes cumbersome chemical or mechanical complementary means.

A main object of the invention is therefore to find a remedy to this drawback by proposing a different method for controlling the nuclear reaction inside the vessel 1 of the reactor.

SUMMARY OF THE INVENTION

For this purpose, the main object of the invention is a nuclear reactor comprising:
  a vessel;
  a core placed in the vessel and containing assemblies of fuel rods;
  at least one internal part placed into the core inside the vessel;
  means for inserting a neutron-absorbing liquid neutron absorber inside the assemblies of fuel rods.

According to the invention, said at least one internal part emerges onto the outside of the vessel in order to connect control devices external to the vessel of the reactor, to the insertion means placed inside the vessel. Preferably, it emerges laterally, but it may emerge elsewhere on the vessel of the reactor. The insertion means comprise transmission components, partly placed in conduits provided in the internal part and emerging on the outside of the vessel on the one hand, and connected to the means for inserting liquid neutron absorber on the other hand.

Preferably, said at least one internal part, is placed above the core and emerges on the outside of the vessel, laterally.

According to a preferential embodiment of the invention, these means for inserting a liquid neutron absorber are means for injecting and distributing a liquid neutron absorber into injection channels placed inside the assemblies of fuel rods.

Provision is made for placing a helium tank belonging to the transmission means, in said at least one internal part.

In a first embodiment of the invention, said at least one internal part is located above the core and formed by an upper internal part emerging on the outside of the vessel, of a lower internal part placed below it, inside the vessel.

In a second embodiment of the invention, the internal part is formed with a single part laterally emerging on the outside.

In order to advantageously complete this arrangement, the nuclear reactor according to the invention is completed with at least one connection arm connected to a side connection outlet of said at least one internal part with the external control devices, the connection arm being jointed in order to be able to assume two positions which are:
  a stretched-out connection position in which a first end of the connection arm ends outside a pool in which the reactor is emerged, and
  a folded position in which the arm is inside said at least one internal part, transmission components being inside the connection arm. With this, the tubes and other cables forming the transmission components found inside the arm, may not have any connection between said at least one internal part and the outside of the pool.

In the preferential embodiment of the circuit for injecting the neutron-absorbing liquid, the latter comprises at least one liquid neutron absorber tank placed in or beneath the internal part.

Further, it is advantageous to use an assembly head providing the connection between said at least one internal part and the channels for injecting the liquid neutron absorber, placed below the internal part, an upper portion penetrating or possibly passing through the internal part.

Conduits of liquid neutron absorber each terminated by a swan-neck penetrate into the tanks and advantageously complete the assembly head.

For the purpose of achieving connections between the conduits placed in the internal part and the means for injecting the liquid neutron absorber, a mobile connection part is advantageously used, placed above the internal part, the conduits of the internal part also emerging on the top of the internal part, the mobile connection part comprising a space opening above the conduits of the internal part, and the conduits are used for connecting the conduits of the internal part with the tanks of the liquid neutron absorber of the injection means controlled by control means placed outside the vessel.

In this case, it is advantageous to use a removable bell placed in the removable connection part, above the location where the conduits of the internal part emerge, and completed with seal gaskets, allowing the different assemblies in the reactor to be connected with a perfect seal.

Several embodiments of the injection channels are possible. Indeed, a first embodiment consists in using for each of them, an external tube inside which at least one capillary tube is placed.

For the purpose of compensating particular effects of the reactivity of the reactor according to the height in the core, the external tube may advantageously have a variable section over the height of the latter, preferably in the height of the external tube.

By placing several capillary tubes in parallel, very fast injection of the neutron absorber is obtained. With this particular arrangement, it is possible to achieve an emergency stop system compatible with the requirements for a nuclear reactor.

Another embodiment consists in completing this assembly with the bell, the purpose of which is to vary the neutron spectrum. This bell may be positioned around an external tube and its capillary tubes. Advantageously, with this last embodiment, it is possible to achieve a variation of the neutron spectrum in the core of the reactor by filling and emptying at will, this open bell on the fluid of the reactor by means of gas transported by the conduits of the internals. By varying the neutron spectrum it is also possible to change nuclei of certain irradiated radioactive materials, such as long-lived waste in order to make them more usable and more storable.

As regards the air distribution circuit, as loading a reactor is performed under water, the removable connection part is completed with lids at the base of the removable bell to achieve the seal of this part before connection with the conduits of the internal part, the conduits of the assembly head and a conduit of the connection removable part.

The lids are perforated when the removable connection part is clamped on the assembly head.

In the preferential embodiment of the invention, the ducts for injecting and distributing the neutron absorber between the tanks and the injection channels located in the assemblies of fuels are placed in the assembly head, over several respective stages depending on the type of function which should be achieved by injecting the neutron absorber into the selected channels.

As for the electrical distribution circuit, in order to be sealed before connecting it onto the internal part, the removable connection part is completed with lids at the basis of the removable bell in which a slightly removable connection part, sealably mounted by means of a gasket, is placed and which may receive a ball valve terminating a cable of the internal part ending up in the space of the removable connection part.

An underwater connectible system of electrical or optical connections able to operate in a liquid medium under very high pressure is then achieved.

In an alternative according to the invention, the conduits in the internal part may be connected to pistons maneuvering stiff control rods.

In another alternative according to the invention, this internal part may be fitted out with electrical conductors in order to maneuver electromagnetic or electric devices which are there also connected to stiff control rods.

The removable connection parts may lock themselves with their complementary shapes.

Finally, their water holes may have a partly helical profile in order to set the fluid of the reactor into rotation to homogenize the temperature of the exiting fluid.

BRIEF DESCRIPTION OF THE DRAWINGS

The invention and its different technical features will be better understood upon reading the following description, followed by several figures respectively illustrating:

FIGS. 9A, 9B, 9C and 9D, two shapes used in the second embodiment of the injection channel according to the invention of FIG. 9;

DETAILED DESCRIPTION OF THE INVENTION

Figure 2:
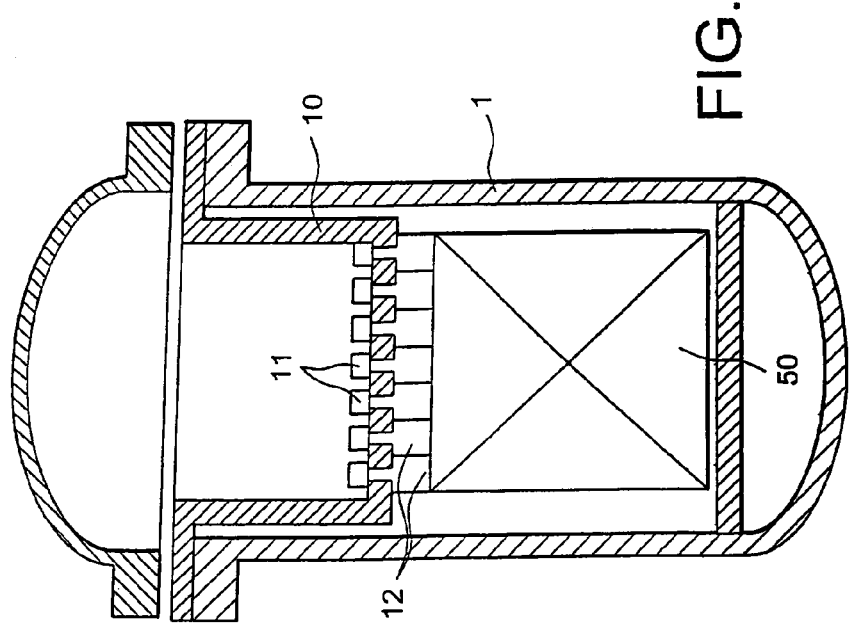
FIG. 2, in a front sectional view, a pressurized water reactor according to the invention.

First, it should be noted that the same reference numerals are used for parts in differing embodiments that perform a similar function. The use of identical reference numerals should in no way be construed to mean that the parts are identical in form or function.

Figure 5A:
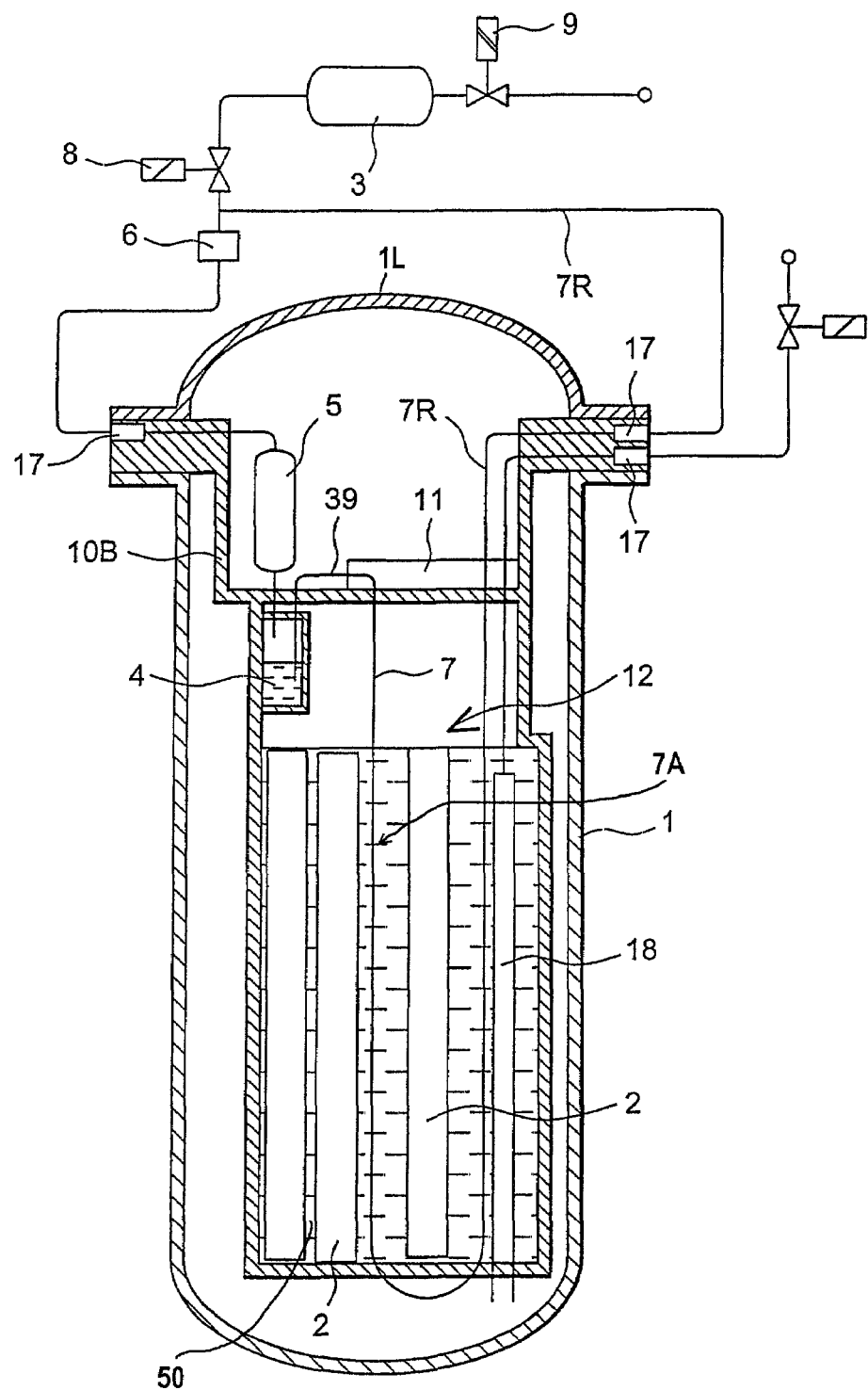
FIGS. 5A and 5B, theoretical diagrams of nuclear reactor facilities according to the invention.

FIG. 5A is a block diagram of the operation of the reactor according to the invention in the case when the means for inserting a neutron absorber are means for injecting and distributing a liquid neutron absorber, and applied to the assembly of fuel rods.

A nuclear reactor vessel 1 containing a core 50 itself comprising a large series of fuel rods 2, is illustrated schematically. Control of the reactivity in the core 50 is obtained with a liquid neutron absorber injected into channels 7 permanently positioned between the fuel rods 2 by injection channels 7. Above the core 50, one or more tanks of liquid neutron absorber 4 are found from which emerge injection channels 7. The whole is placed under the internal part 10 (or the internal assembly if it is made in several portions) which is used in each nuclear reactor to hold the core 50 into place, i.e., in the lower portion of the vessel 1.

This FIG. 5A highlights a portion of the transmission means, i.e., the gas supply and more particularly the helium supply system, allowing the liquid neutron absorber to be displaced. Indeed, at least one helium tank 5 (shown here on the outside) is found in the internal part 10 or its equivalent. Its filling and emptying is controlled by a distribution solenoid valve 8 completed with a pressure loss diaphragm 6. A return conduit 7R from the base of each injection channel 7 and ending upstream from the diaphragm 6, allows with the latter, a pressure difference to be generated between both branches of the injection channel 7 of the liquid neutron-absorber. This set-up is completed upstream from a discharge tank 3 controlled by a pressurization solenoid valve 9.

It is noted that the internal part 10B or its equivalent emerges on the outside of the vessel 1, laterally, and has side connectors 17 at this level. It may emerge elsewhere for example onto the bottom of the vessel 1, with other internal connection parts.

Thus, the different conduits, circuits controlling and feeding the means for inserting a neutron absorber, notably the helium supply, may be connected to this internal part 10B outside the vessel 1 with control means 400, 401, 403 external to the vessel 1. Thus, all the control means 400, 401, 403 used for regulating the nuclear power of the reactor pass through this internal part 10B, without passing through the vessel 1 or the vessel lid 1L, as this is exactly the case for control rods 204 (shown in FIG. 14) used in nuclear reactors of customary design. This also limits the risk of a leak since the conduits transporting the pneumatic, hydraulic fluids, the electrical or optical conductors are integrated into the bulk of the internal part 10B.

Figure 1:
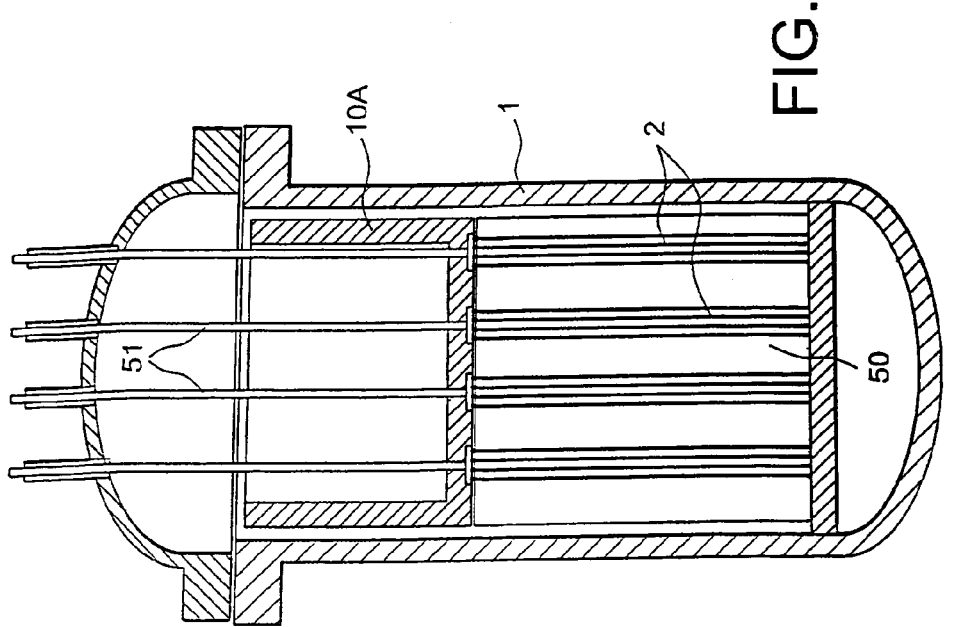
FIG. 1, in a front sectional view, a pressurized water nuclear reactor according to the prior art.
Figure 4:
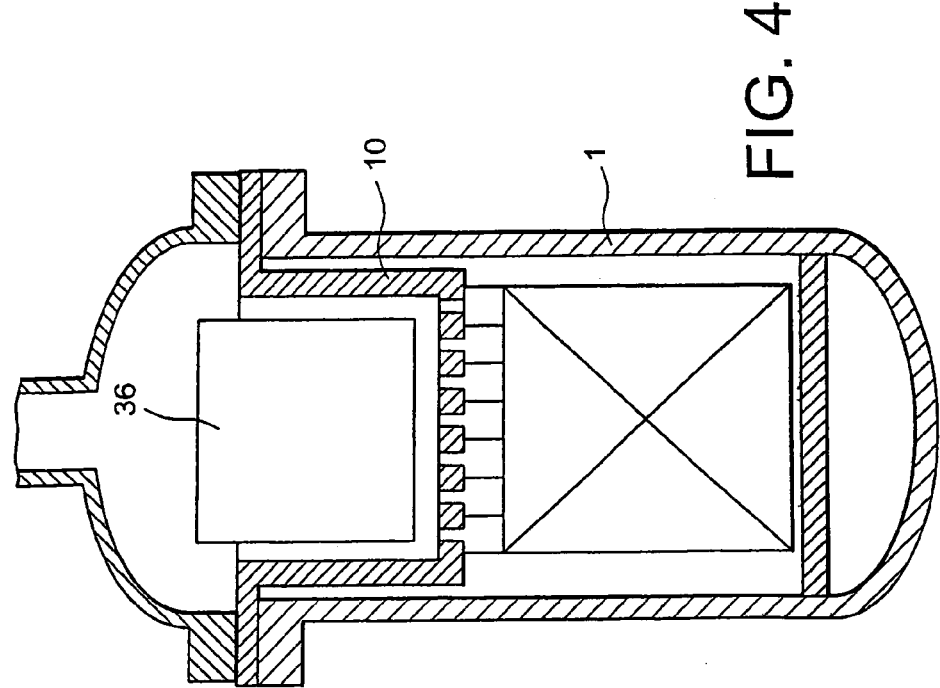
FIG. 4, in a front sectional view, a boiling water reactor according to the invention.
Figure 3:
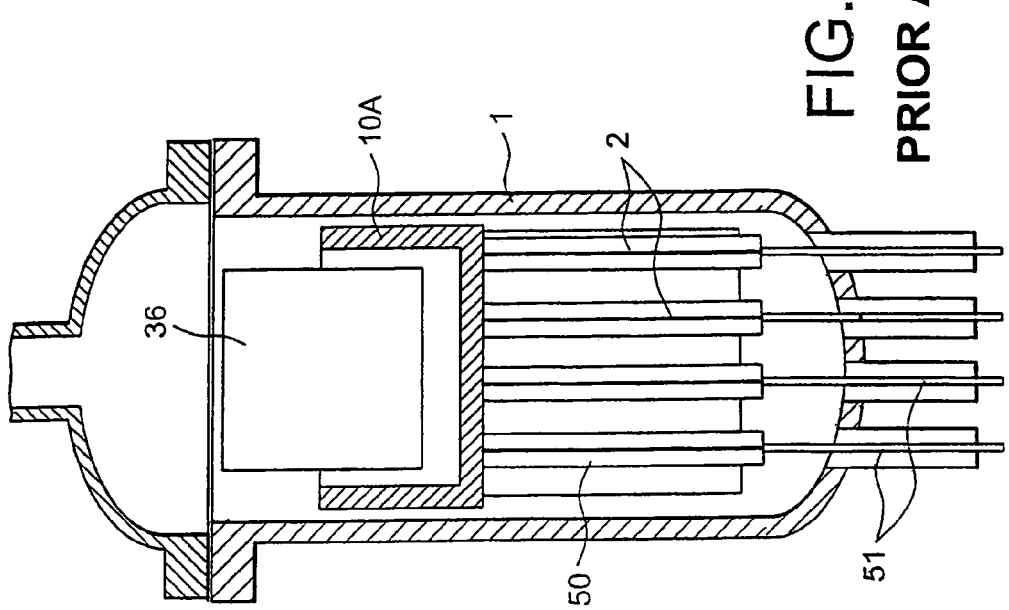
FIG. 3, in a front sectional view, a boiling water reactor according to the prior art.

FIGS. 2 and 4 as a respective comparison with FIGS. 1 and 3, show the changes, enhancements and potential advantages provided by the device according to the invention. Indeed, the internal part 10 (FIGS. 2 and 4) emerging on the outside of the vessel 1 provides complete control of the core 50 of the reactor. Thus, the upper space inside the vessel 1 is cleared for the pressurized water reactor of FIG. 2 and the space under the vessel 1 of the boiling water reactor of FIG. 3 is also cleared.

Figure 6A:
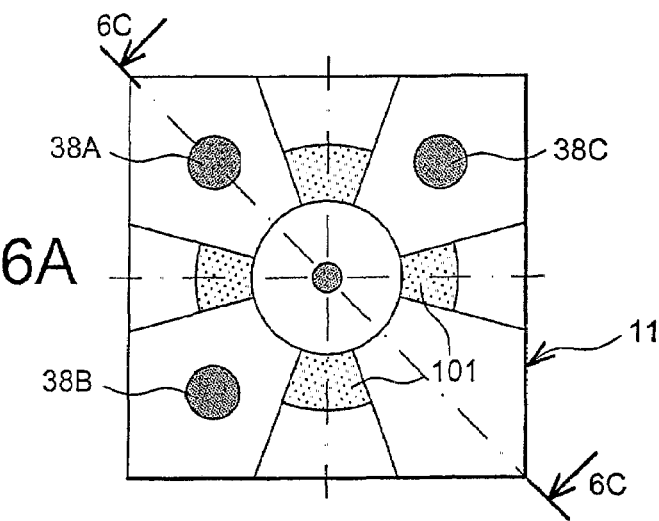
FIG. 6A, a top view of the removable connection part, according to the invention.
Figure 6B:
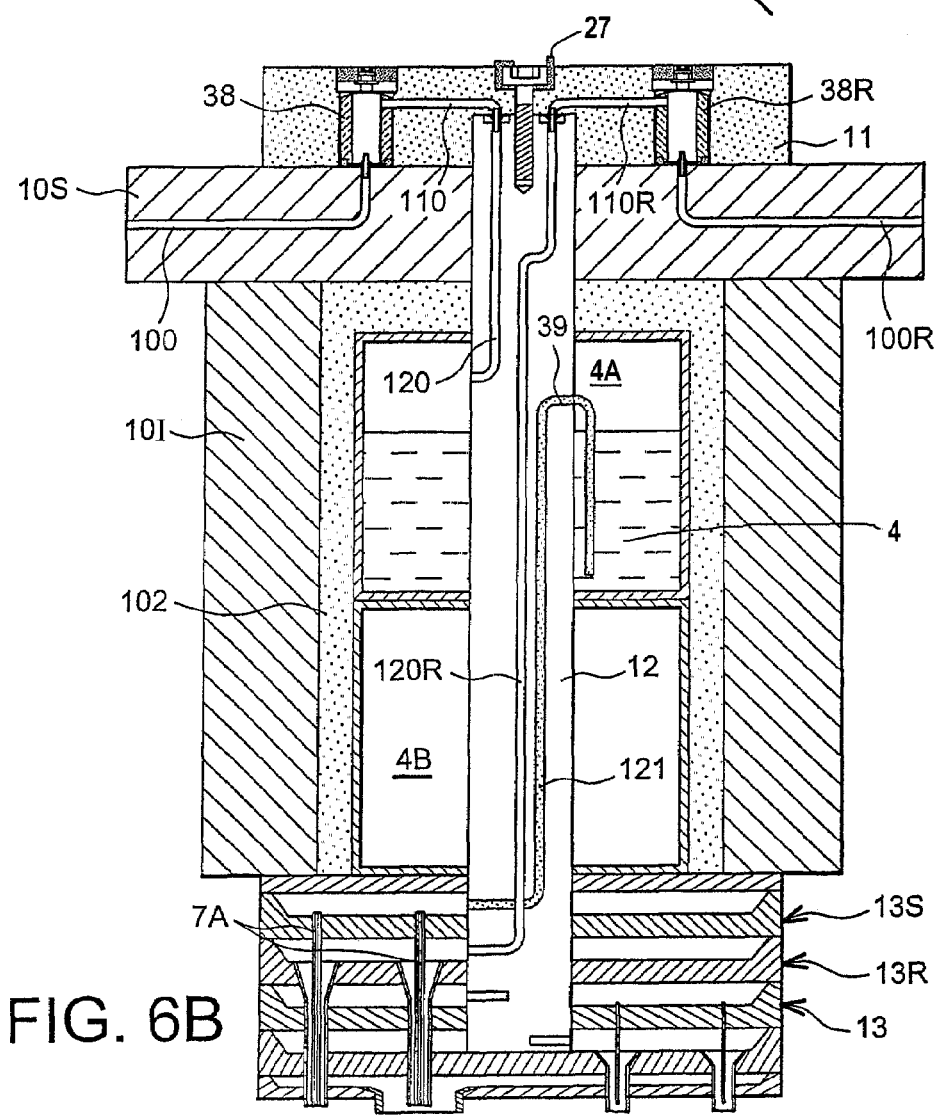
FIG. 6B, a sectional view along line 6B-6B of FIG. 6A.

Indeed, with reference to FIGS. 6A and 6B, it is seen that a removable connection part 11 is placed above an internal part, which is made here in two portions: an upper internal part 10S and a lower internal part 10I. The upper internal part 10S comprises ducts or conduits 100 providing supply of power to the means for inserting a neutron absorber. The lower internal part 10I, corresponds to the traditional internal part 10A (FIGS. 1 and 3) both geographically and functionally, which is attached onto the vessel 1. It also provides the function for housing certain pieces of equipment of the storage means, i.e., tanks for the neutron-absorbing liquid 4, for example an upper tank 4A and a lower tank 4B.

FIG. 6B, as a sectional view, shows a conduit 100 placed inside the upper internal part 10S. It emerges into a cavity 38A of the mobile connection part 11, around a connection bell 38. In fact, the mobile connection part 11 is placed above the internal part 10, 10A, or the equivalent assembly, so that it may be dismantled relatively easily, for its maintenance or for changing gaskets or connection members. It is attached thereon by means of screws 26 and a rotation stop for example formed with a foldable washer 27. The mobile connection part 11 itself has a conduit 110 joining the interior of the connection bell 38 with the upper portion of the assembly head 12 itself having conduits 120 emerging on the tanks 4A and 4B of liquid neutron absorber.

These different conduits 100, 110 and 120, are relative to the distribution of the gas for pushing the liquid neutron absorber into the core of the reactor. It should be taken into consideration that other distribution networks are installed in the internal part(s) and the mobile connection part 11. This same upper internal part 10S is used for letting through electrical cables, with the purpose of sending back to the outside world information from sensors or control means located within the reactor. These may be i.e. electrical or optical networks for control or monitoring, and all the other conduits required for the flow of fluid or for signal transmission components.

FIG. 6A shows a top view of the removable connection part 11, and notably of the cavity 38A.

It may be seen that other cavities 38B and 38C have been illustrated in FIG. 6A. They correspond to communication spaces between different conduits providing connection of electrical conductors or hydraulic, pneumatic or other conduits, or relating to other units for controlling or monitoring the core of the reactor.

Figure 5B:
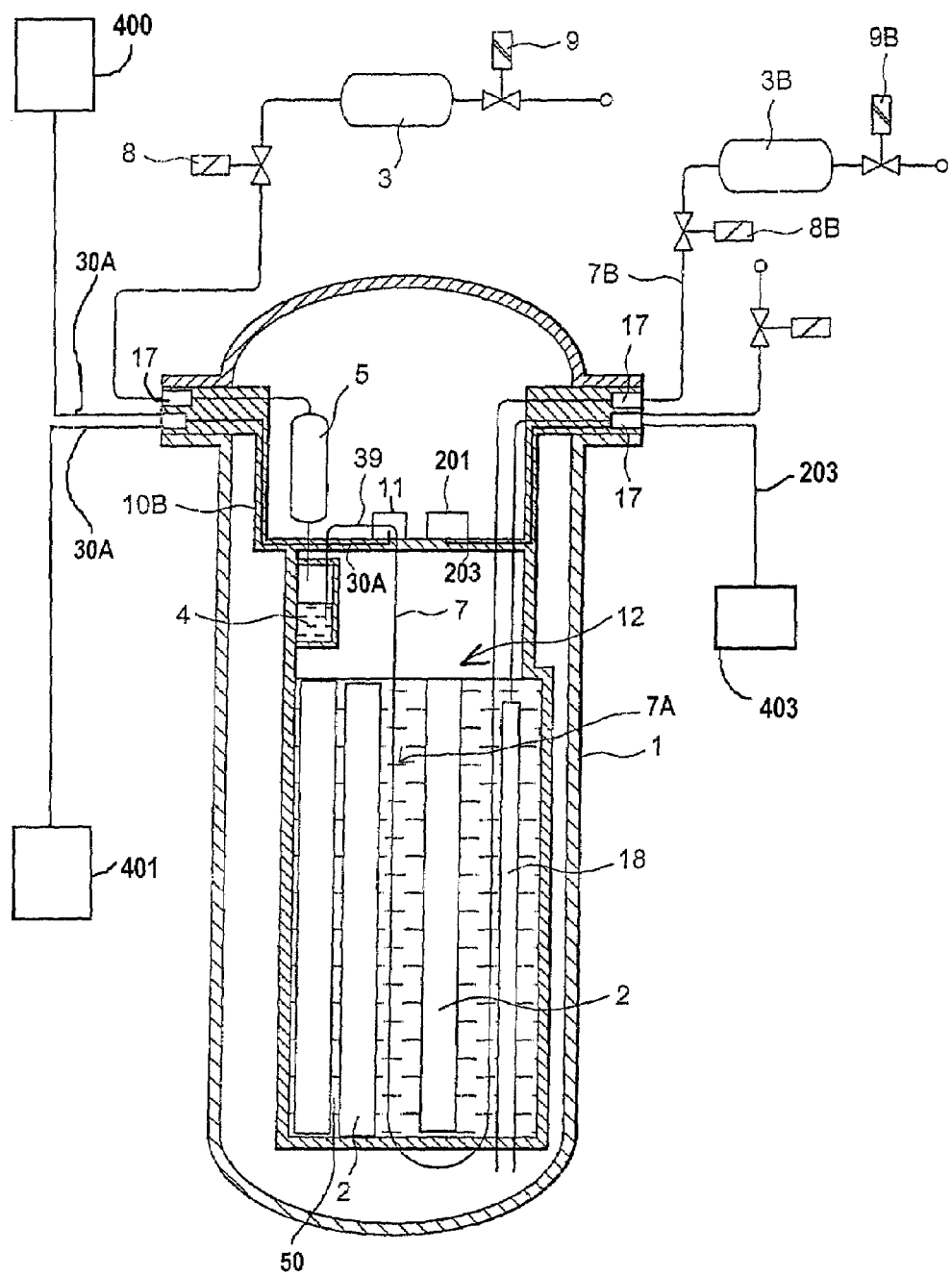

The lower portion of the assembly head has several stages 13. It is seen that the upper stage 13S receives at the inlet of a conduit, a liquid neutron absorber 121, from a liquid neutron absorber tank 4A placed in a lower internal portion 10I. Swan-necks 39 are used on the injection channels 7 for the purpose of preventing untimely injections of liquid neutron absorber. It is easily understood that, with a pneumatic control circuit ending in a liquid neutron absorber tank 4A, it is possible to inject into first injection channels 7A emerging into the upper stage 13S, a certain amount of liquid neutron absorber intended for achieving a desired result on the moderation of the operating power of the core of the reactor;

Thus, by having several stages 13 and 13S available, several neutron-absorbing liquid supply circuits, each controlling and feeding the means for inserting a neutron absorber, controlled differently and independently of one another by different conduits, may be provided. It is thus possible, by using different circuits to modulate the operating power of the core 50, to proceed with an emergency stop or to act on the geographical distribution of the fission reaction inside the core (offset), (i.e., a vertical axial distribution of the nuclear activity within the core). To do this, a device similar to the one described by FIG. 5B is used, in which the pressure loss diaphragm 6 is removed and the injection conduit 7 and return conduit 7R are separated into two branches. On each of these branches, one then includes the helium distribution valve 8, the helium tank 3 and the pressurized solenoid valve 9 with which the height of the neutron absorbing liquid 4 may be adjusted in the injection conduit 7.

A second pressure control line is materialized by a return conduit 120R in communication with the second end of the injection channels through a return stage 13R extending through a conduit 110R and a removable bell 38R of the removable connection part 11 and a conduit 100R of the internal part 10S.

A water passage 102 is provided around the liquid neutron absorber tanks 4A and 4B. At the same time, vents 101 are provided in the mobile connection part 11 (see FIG. 6A). The latter ones and the volume of water 102 account for the passing of water through these control components and the internal parts 10S and 10I. Indeed, it should be kept in mind that a very large flux of liquid passes through the core of a reactor and it has to pass into the upper portion of the vessel, i.e., pass through the internal part(s) 10, 10I and 10S.

Figure 6C:
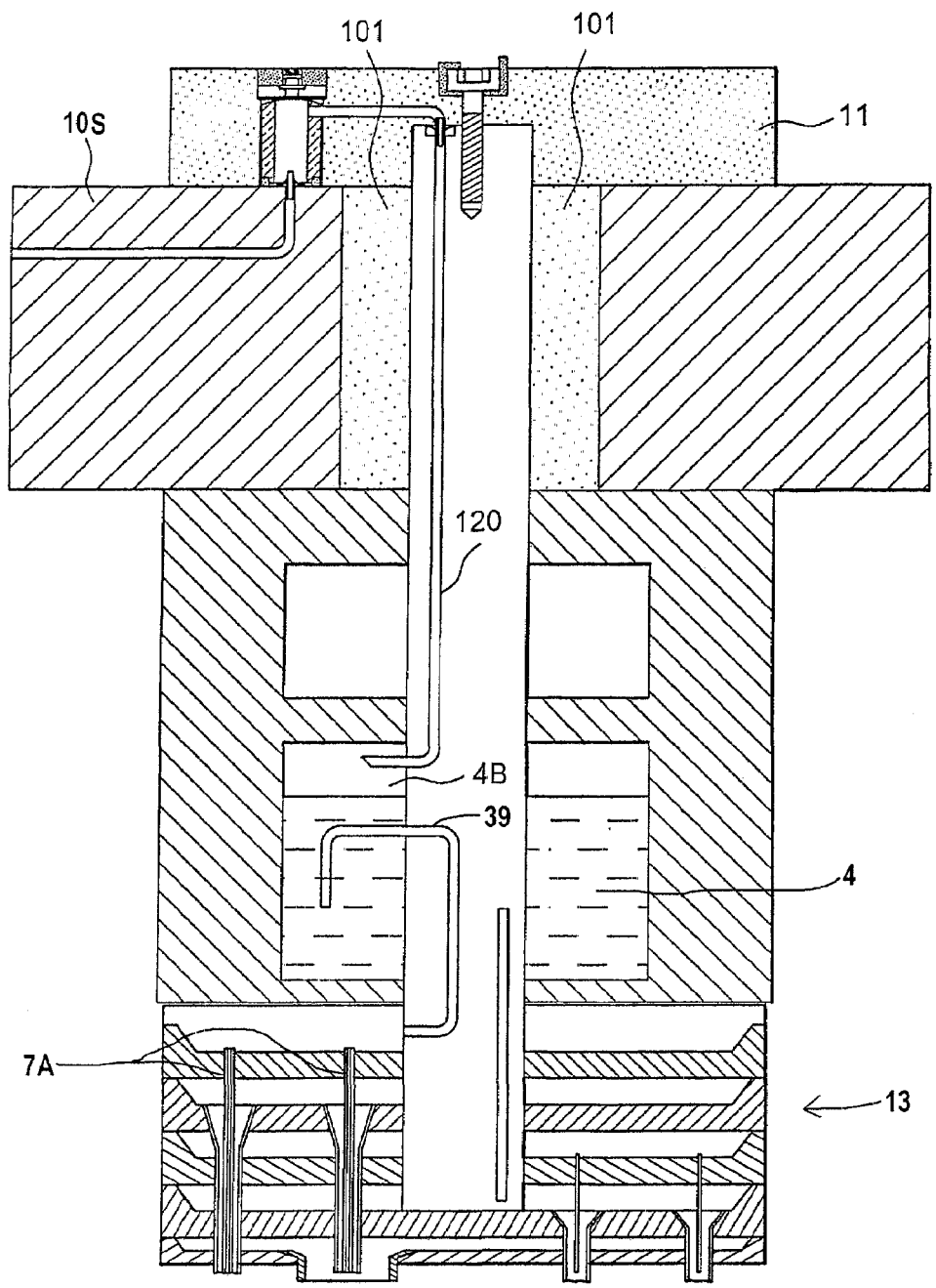
FIG. 6C, a front sectional view along line 6C-6C of FIG. 6A.

FIG. 6C illustrates the assembly according to another sectional view along line 6C-6C of FIG. 6A. Thus, it is possible to see inter alia vents 101 in the internal part 10 and a conduit 120C ending in the lower liquid neutron absorber tank 4B.

Figure 7A:
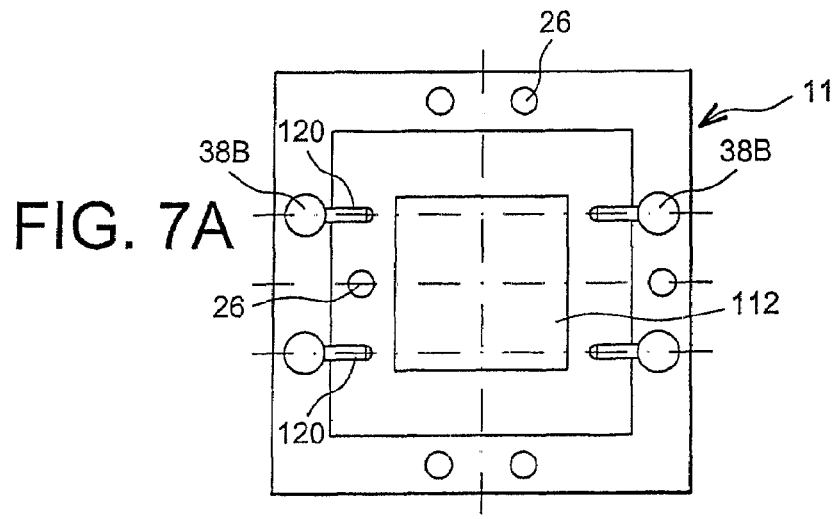
FIG. 7A, a top view of a second embodiment of the removable connection part, according to the invention.
Figure 7B:
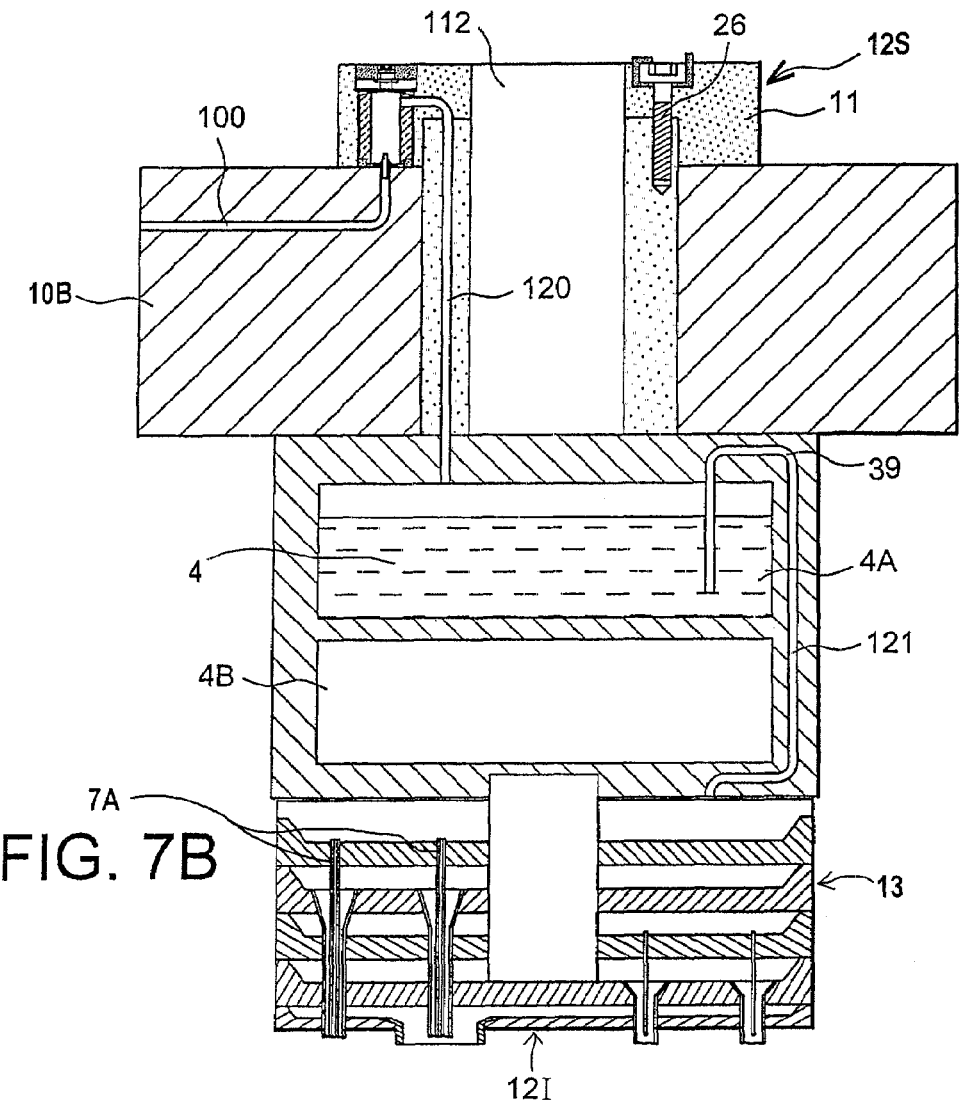
FIG. 7B, a sectional view along line 7B-7B of FIG. 7A.

FIGS. 7A and 7B illustrate another embodiment of the components which have just been described concurrently with FIGS. 6A and 6B. In this embodiment, the internal assembly of FIGS. 6B, 6C formed by both lower 10I and upper 10S internal parts is replaced with a single internal part 10B, the shape of which may relate to that of the already existing parts. The connection through a conduit 100, the removable connection part 11 is similar. The removable connection part 11 is still placed on the upper surface of the internal part 10B by means of screws 26. On the other hand, a central passage 112 allows the water to flow through.

A tank part 4 containing two liquid neutron absorber tanks 4A and 4B is found below the internal part 10. In this embodiment, operation is similar. In other words, the pressure arrives in the liquid neutron absorber tanks 4A and 4B via the conduit 120 of an upper portion of the assembly head 12S. The liquid neutron absorber flows down one or more stages 13 of a lower portion 121 of the assembly head by means of an extended swan-neck 39 of the supply conduit 121.

FIG. 7A shows the flow of water through the removable connection part 11, i.e., through the central conduit 112. The screws 26 have also been illustrated in this figure, as well as the cavities 38B of the removable connection part 11 and the beginning of the conduits 120.

Figure 8:
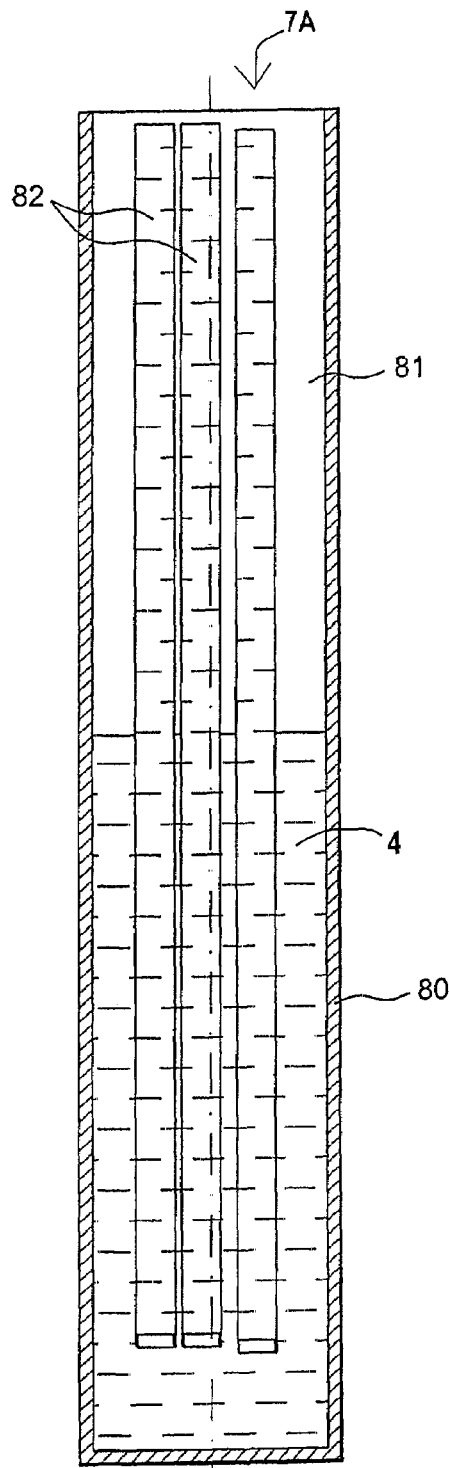
FIG. 8, as a front sectional view, a first embodiment of an injection channel.

With reference to FIG. 8, a first embodiment of the injection channels is provided for proceeding with emergency stops of the reactor. The rapidity of injecting the liquid neutron absorber is therefore preferential here. To achieve this rapid injection, an external tube 80 is used, inside which several capillary tubes 82 are placed; with the remaining space 81, it is possible to cause rapid injection of the liquid neutron absorber into this assembly by varying the pressure by means of helium which acts on the liquid neutron absorber tanks. Upon a command for urgently stopping the reactor, all the capillary tubes 82, mounted in parallel, are fed with liquid neutron absorber which rapidly penetrates into the whole external tube 80.

Figure 9:
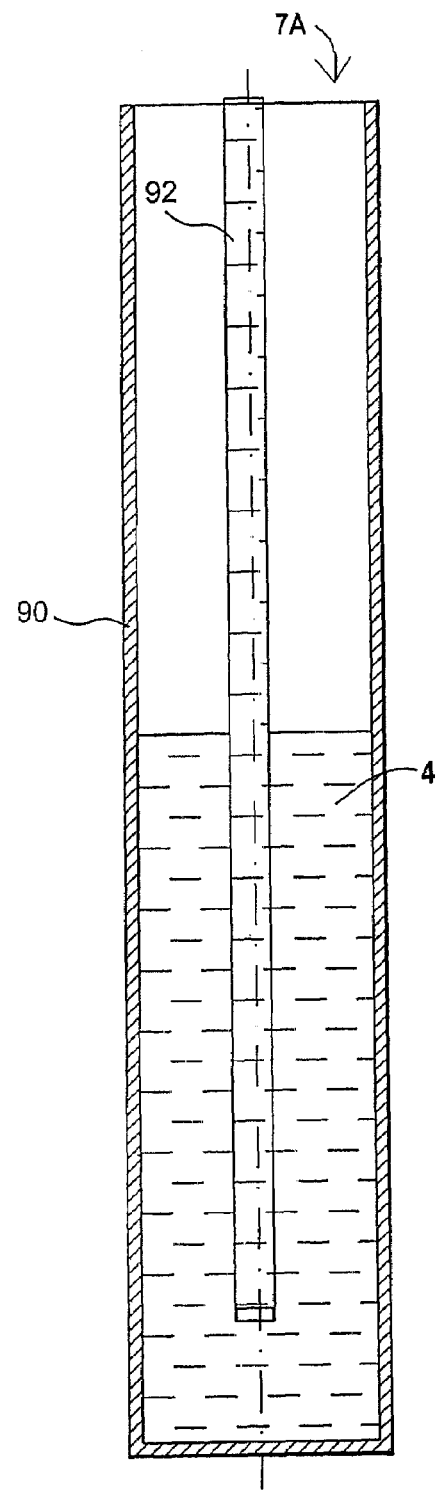
FIG. 9, as a front sectional view, a second embodiment of an injection channel of the reactor according to the invention.

FIG. 9 shows a sub-assembly used for proceeding with regulation of the power of the reactor's core. The external tube 90 only contains a single capillary tube 92. This is explained by the non-requirement for rapidly obtaining a large amount of liquid neutron absorber. However, this channel may be used for functions other than the emergency stop.

With reference to FIGS. 9A, 9B, 9C and 9D, the possibility of giving the reference external tube 90 in FIG. 9 a shape with a variable section over its height is of interest. Indeed, in FIG. 9A, the external tube 900 has a larger section in its upper portion. FIG. 9B shows that this shape may be cylindrical, with the capillary tube 92 remaining unchanged. With this, it is possible to accumulate a larger amount of liquid neutron absorber in the upper portion of the functional portion of the reactor's core, in order to influence the reactivity of the latter in a more significative way.

FIGS. 9C and 9D show a second possible shape of the external tube 901, the section of which constantly varies from a certain height and it assumes a flared shape in its front sectional view. FIG. 9D shows that the section may also assume the form of a cross.

It may be noted that other shapes of external tubes may be contemplated. A rolling-up of the tube on itself may have the same advantage.

Figure 10A:
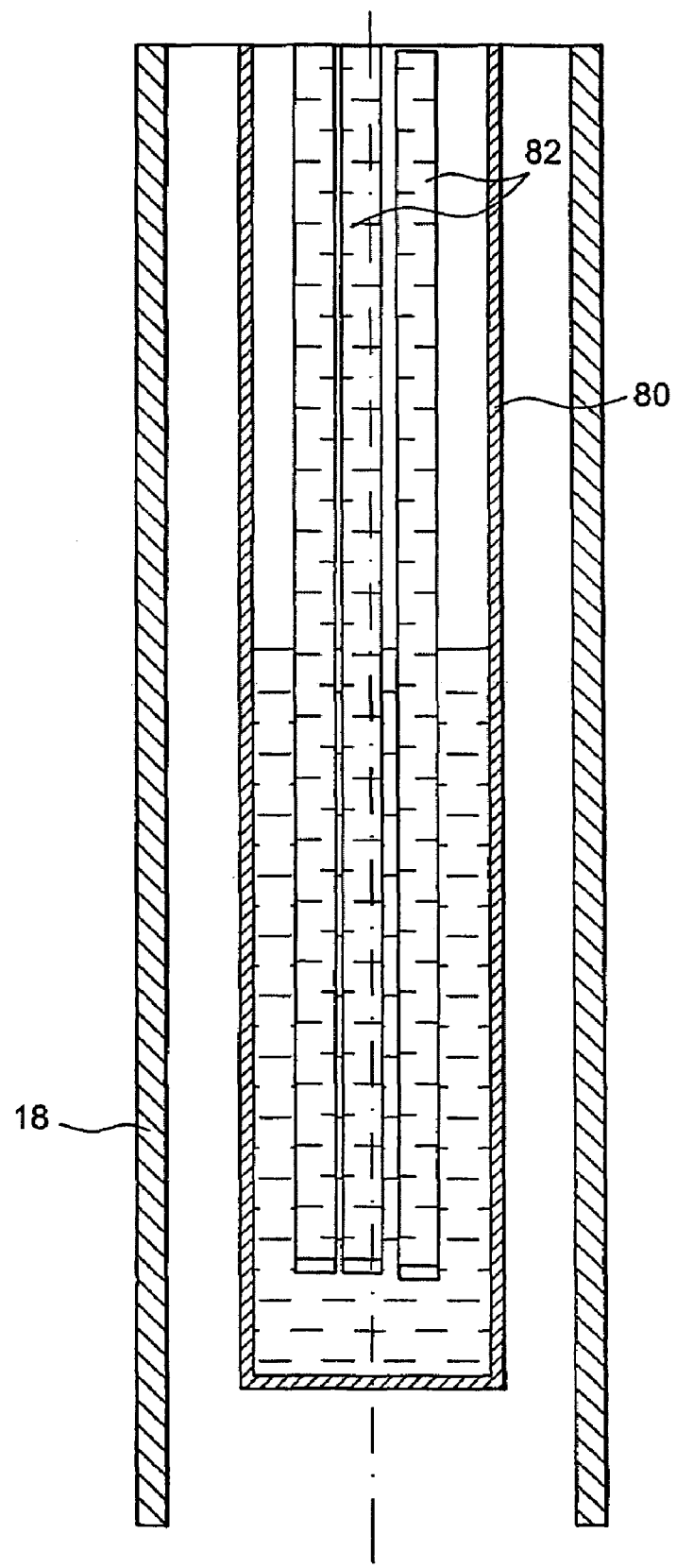
FIG. 10A, as a sectional view, a third embodiment of an injection channel according to the present invention.

FIG. 10A shows an assembly intended for moderating the flux at the very inside of the reactor's core 50. The assembly of FIG. 8 comprising the external tube 80 and the injection channels 82 is completed with a spectrum variation bell 18 surrounding the assembly. When the spectrum variation bell 18 is empty, the neutron spectrum enables the fuel to be regenerated. When the pressure bell 18 is filled with a coolant fluid, an increased moderation of the flux is obtained which allows the fuel of the reactor to be consumed. These neutron flux changes inside the reactor may also be used as means for varying the reactivity.

Preferably, the spectrum variation bell 18 consists of a zirconium tube or of any other material transparent to neutrons. When it is filled with a moderator liquid, for example the water of the reactor, it has the same moderating power with respect to the neutrons as the water flowing outside this tube. When it is filled with helium or any other gas or liquid, having only an effect on the neutrons, the spectrum variation bell 18 creates a void effect which does not slow down the neutrons and so the neutrons emitted by the fuel pencils may regenerate a fissile atom, for example plutonium, by bombardment of a fissile nucleus which may be uranium, plutonium, thorium, for example.

Figure 10B:
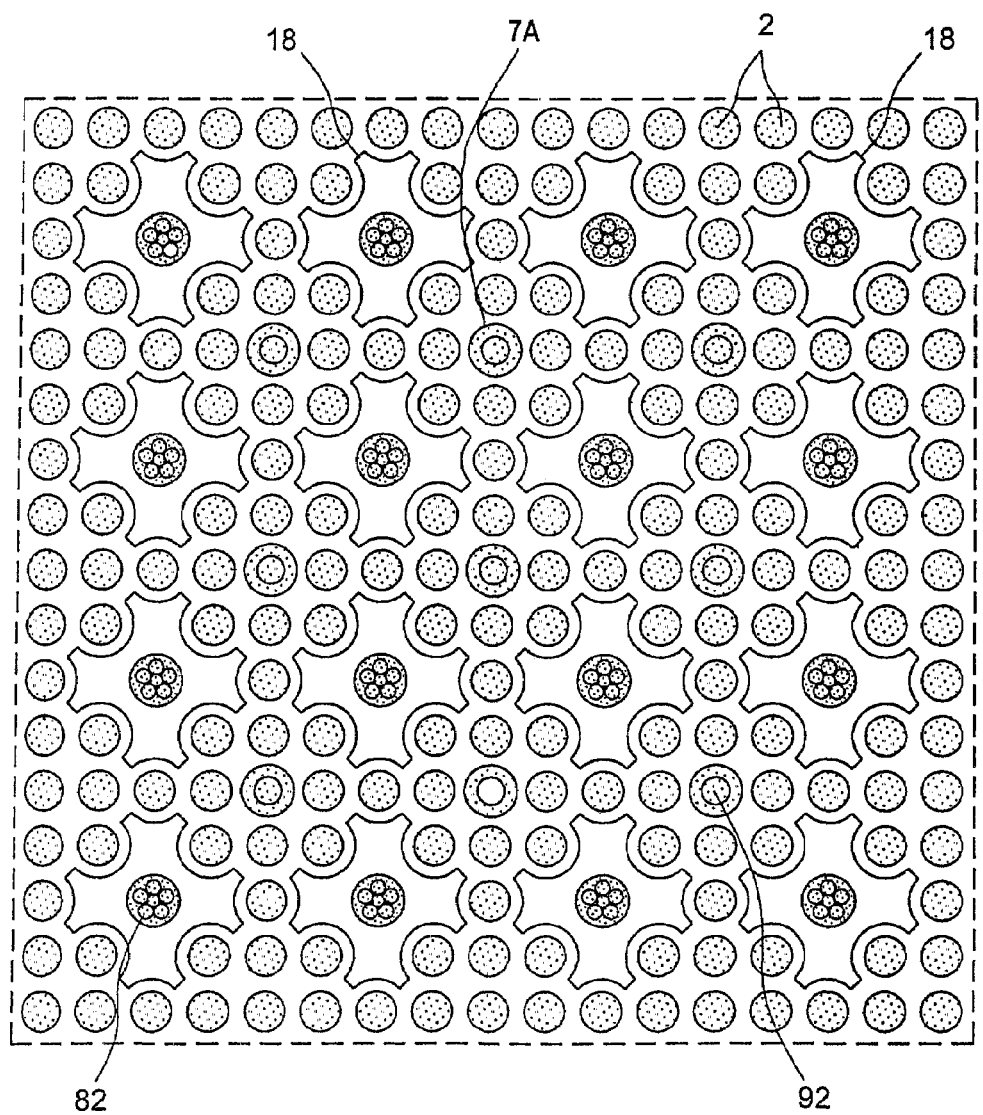
FIG. 10B, an application of the embodiments illustrated in FIGS. 8, 9 and 10A.

With FIG. 10B, it may be shown how the different injection channels of FIGS. 8, 9 and 10A are used, as well as the spectrum variation bell 18 of FIG. 10A. Indeed, this horizontal sectional view shows the bundle of the core of the reactor. The capillary tubes 82 which are each grouped in the middle of a spectrum variation bell 18, form rapid or emergency stop injection tubes. Actually, they may provide a larger amount of helium within a given time. The capillary tubes 92 which are placed in the middle of bundles of fuel rods 2 are provided for controlling the reactivity of the reactor. The spectrum variation bell 18 assumes the form of a cross including the ends and the inside of the arms which may have a concave shape to fit the cylindrical shape of the fuel rods 2.

It is reported that, within the scope of production of electricity, the fuel rods are therefore consumed over a determined period. In another mode of use of a nuclear reactor, modified radioactive material rods may be placed, such as used fuels such as americium, neptunium, and curium, in particular). Indeed, such materials may become less radioactive, following their passage in a nuclear reactor of this type, transmutation of these elements even allowing the destruction of such long-lived waste. In other words, a particular use of a nuclear reactor of this type is the incineration of long-lived radioactive waste.

This type of spectrum variation bell 18 provides the possibility of controlling by the gas pressure in the tubes, the ratio between the volume occupied by the medium which moderates the neutrons in a constant vessel volume and the volume occupied by the fuel. This ratio is called "the void rate".

This void effect also acts on the moderation effect and because of this same moderation effect, it changes the power of the reactor. Consequently, the power of the reactor may also be changed by changing the void rate within the latter.

Operating the pressure inside the channels may be managed in a binary, i.e. on-off way, or used for compensating the flux deformations called "axial offset". The principle remains the same, but the level of the liquid neutron absorber in the injection channel is controlled by the pressure difference which exists across this injection channel. Each end of the latter is connected to a pressurized sphere. The pressure of each sphere is controlled by a discharge solenoid valve and a filling solenoid valve.

Figure 11:
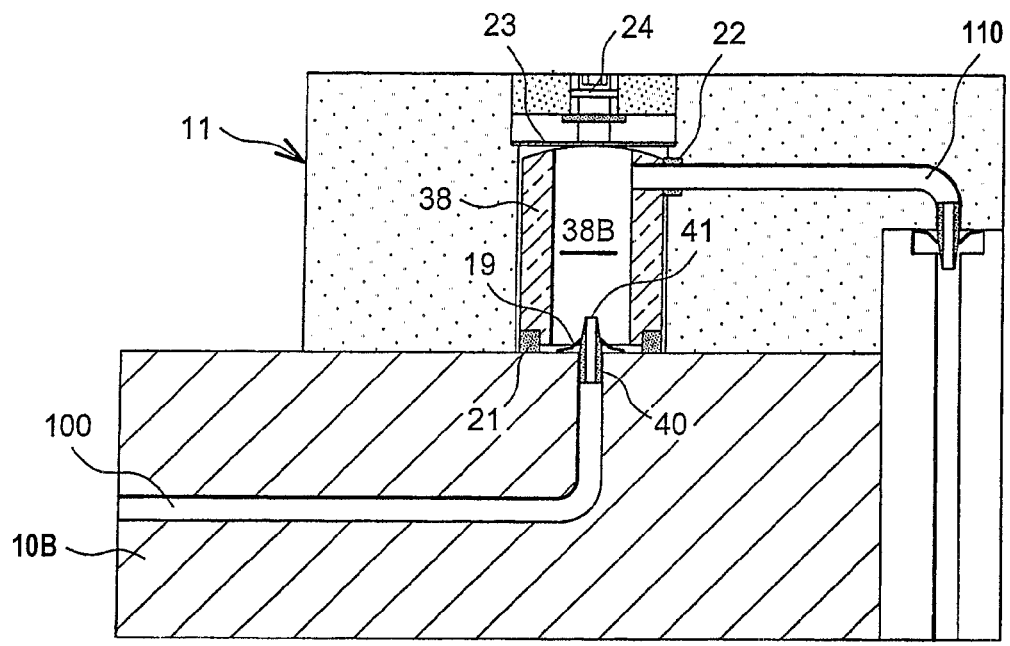
FIG. 11, as a sectional view, a detail of the embodiment of the removable connection part of the reactor according to invention.

FIG. 11 shows a detail of the embodiment of the removable connection part 11 concerning the connections of the pneumatic circuit. Again, a conduit 100 is found, passing through the internal part 10 and emerging into the cavity 38B of the connection bell 38. For this purpose, lids 19 are used with each being crossed by a ball valve 40 provided with a tip 41. The connection bell 38 is fitted with a lower gasket 21 and a side gasket 22. To adjust the positioning of the connection bell 38 and its support on the removable connection part 11, a screw 24 acting on a flexible seal membrane 23 is used, placed above the removable connection bell 38.

Figure 12:
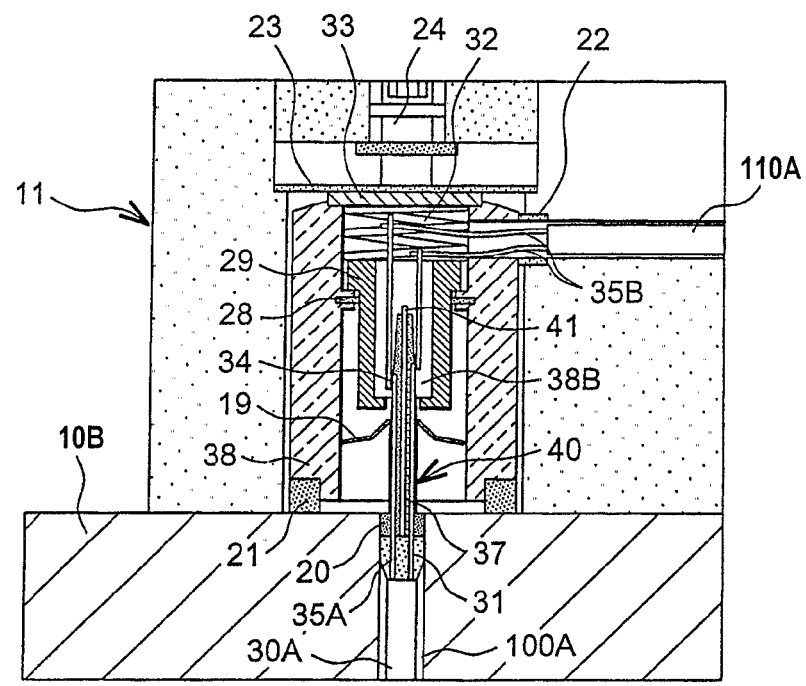
FIG. 12, as a sectional view, another detail of the embodiment of the removable connection part of the reactor according to the invention.

An example of an electrical connection at the removable connection part 11, under a gas so as to be sealed off at a very high pressure, is illustrated in FIG. 12, the sectional view being taken along another diameter of the removable connection part 11.

The removable connection bell 38 and its cavity 38B are again found with the different gaskets and accessories which allow it to be held in place. A cable 30A emerges from a conduit 100A of the internal part 10. The cable 30A may very well not occupy the whole of this conduit 100A. Indeed, other means for transmitting electrical or optical signals may be used. It is noted that the ball valve 40 includes a central conduit 37 allowing the gas from the outside of the vessel to pass through an insulating part 31. The ball valve 40 with its tip 41 pierces through the lid 19, pressurized gas preventing the coolant fluid of the reactor from filling the inside of the removable connection bell 38 and in particular, a connection part 34 placed in a piston 29 slidably mounted inside the removable connection bell 38. The seal may be provided with a gasket 28 at its level. For this purpose, a spring 32 presses against an added lid 33 so as to apply a proper connection contact.

Thus, different conductors, for example 35A, of the first cable 30A, may be put into contact with conductors 35B placed downstream, inside the removable connection part 11. The flexibility of the gasket 28 at the piston 29 provides centering of the ball valve 40 in the connecting part 34.

With such assemblies, the connection between different electrical or optical conductors, such as optical fibers, may be performed under gas and away from any fluid. Indeed, with the gasket 28 of the piston 29, the latter may have a slight play so that the ball valve 40 may be centered via a centering part 20.

Figure 13:
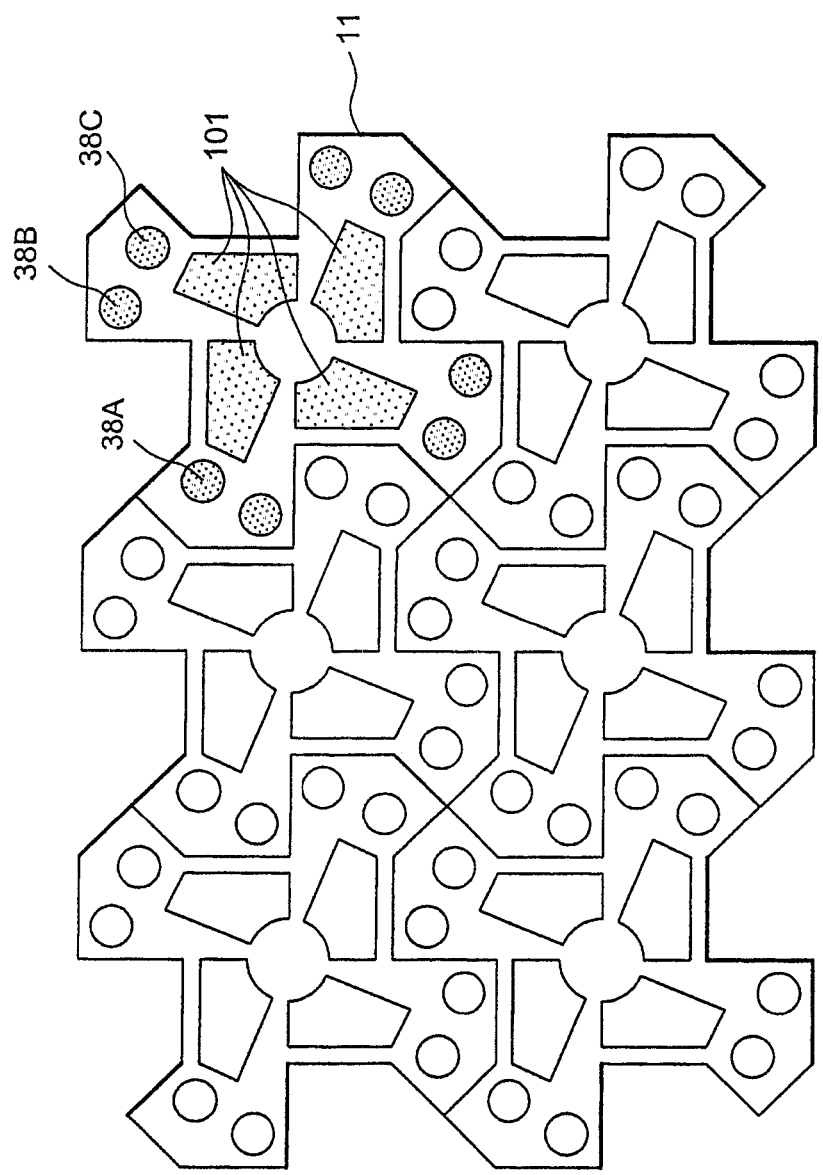
FIG. 13, a particular shape of the removable connection parts.

As shown in FIG. 13, the removable connection part 11, may have a complementary shape which allows a plurality of them to nest with each other, which makes them self-locking. Further, the water holes 101A may be profiled in order to set the fluid into rotation, which mixes and homogenizes the temperature of the water flowing out of the assemblies.

Figure 14:
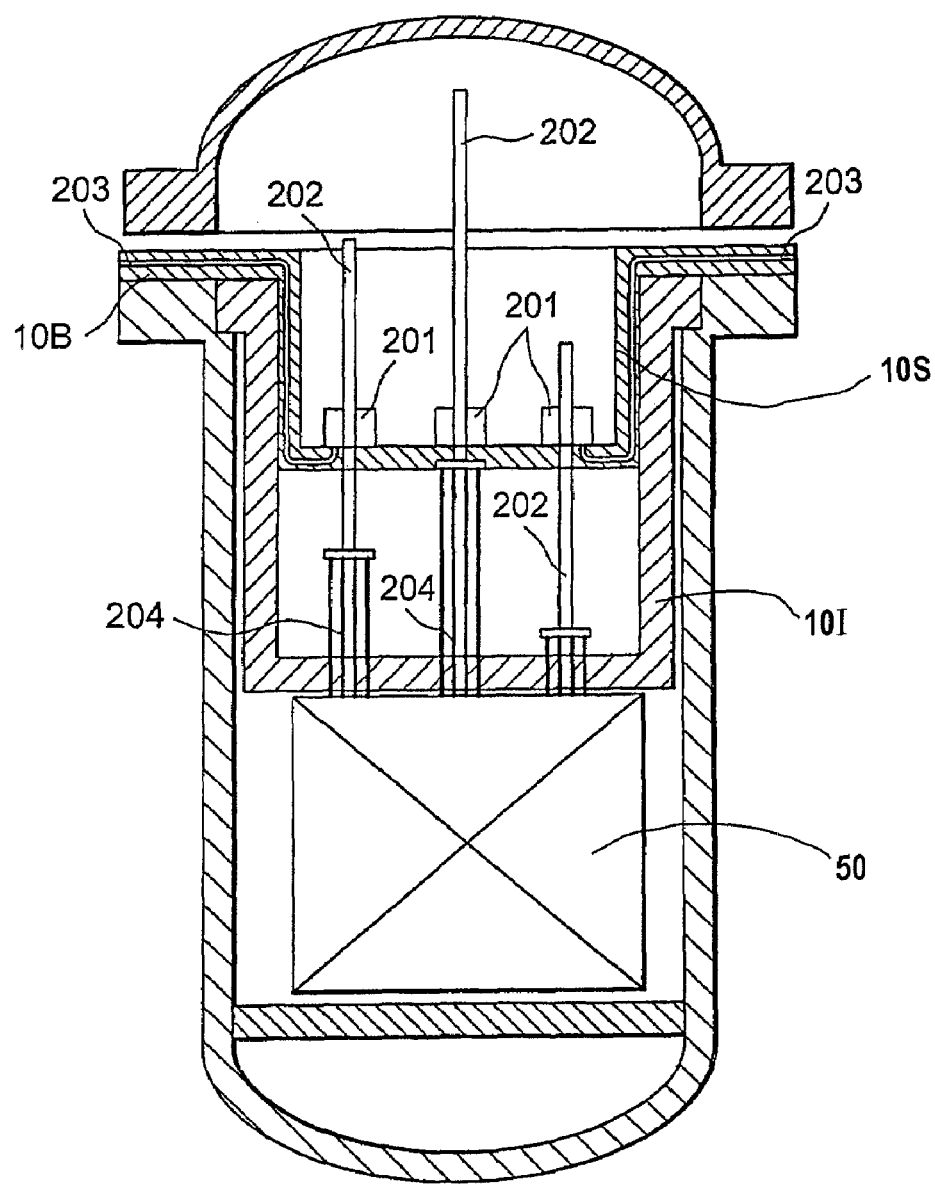
FIG. 14, as a front sectional view, an alternative embodiment of the reactor according to the invention.

FIG. 14 shows an alternative in which control rods are used. Transmission means 203, which may be electrical cables, but also feed pipes, pass through the internal part(s) 10B and put the driving displacement means or other means 201 driven with pneumatic, hydraulic or electrical power, into relation with the outside of the vessel, which maneuver axes 202 permanently attached to the control rods 204. In this case, the driving displacement means 201 are placed above the internal part 10B.

With this system, although less performing, it is also possible to regulate a nuclear reactor without passing through the vessel lid or through the vessel itself.

It is noted that in all the variations of the system according to the invention, it is possible to use the internal part 10B or its equivalent, i.e., parts 10I and 10S, for installing tubes or conduits therein, the function of which is to feed pressure bells at will, open onto the coolant fluid of the reactor and located in or between the fuel assemblies. In this case, by varying the pressure, it is possible to vary the level of the coolant fluid in the pressure bell around the injection channels.

In all the alternatives according to the invention, the internal parts 10B, 10S and 10I, may also be used for allowing the passage of any conductor, the function of which is to transmit signals emitted by measuring or viewing means, such as fission chambers or neutron detectors, for example of the collectron or fission chamber type, for measuring the neutron flux and determining a flux map, thermocouples, optical fibers and cameras. They are also used for bringing back to the outside world, information from measuring sensors or monitoring means located in the reactor. A connection is then used such as the one illustrated by FIG. 12, these cables passing through the insulating part 31 and piercing the lid 19.

The internal parts, 10B, 10S or 10I, comprising transmission components, are not necessarily placed above the core. It may be contemplated to place them below the core, for example.

Figure 15:
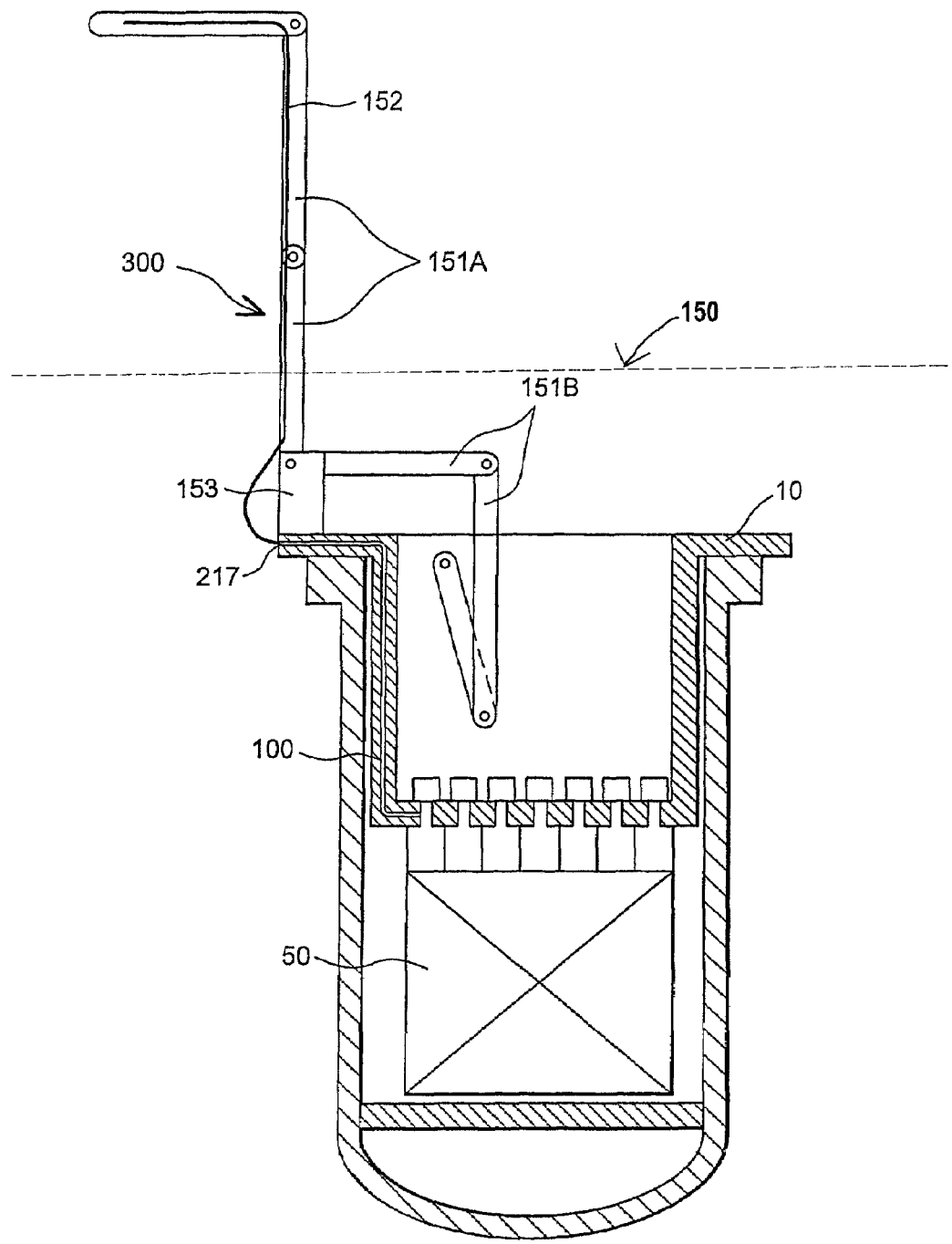
FIG. 15, a complement of the reactor according to the invention.

With reference to FIG. 15, the conduits 100 laterally placed in the internal part(s) 10 end in a side outlet 217. Advantageously, they may be extended by identical cables or conduits 152 which are borne by a jointed arm 300. Indeed, the latter may be attached to the end of the internal part 10 through a base 153. Each jointed arm has several sections which may be laid out in order to reach the edge of the pool 150 in which the reactor is installed. This laid-out position is illustrated by the sections 151A. Thus, all the tubes required for pressurizing each of the tanks containing liquid neutron absorber, may be "without any connection", from the edge of the pool where control devices are found, to the interior of the internal part. The side connectors 17 of the embodiment illustrated in FIGS. 5A and 5B, are then suppressed.

In other words, the conduit 100 in the preferred application according to the invention may be a continuous tube from the interior of the internal part 10B of the reactor up to the end of the arm 300 of the reactor. Connection to the other apparatuses forms the basic scheme required for operating the reactor.

Another possibility consists in connecting a tube or flexible tube to the outlet of the upper internal part 10S by a weld, a connector, or another component. On the other side, this same tube or flexible tube may be connected to one of the tubes contained in the sections 151A of the arm 300, and this in an identical way (weld, or other connection). However, this last method adds one connection per tube, it is therefore less reliable.

With the joint of the jointed arm, the latter may be folded as indicated by the position of the sections 151B. Indeed, the latter are again found inside the internal part 10B. The use of this position is provided for the case of unloading the fuel inside the core 50 of the nuclear reactor for which the internal part 10B needs to be removed. The internal part 10B may thereby be removed and laid down outside the pool with reduced bulk, the jointed arm being inside the pool 150.

Thus, once it is stretched out, the jointed arm allows the electrical, pneumatic or other connection points to be transferred outside the pool 150. The joint may be obtained by welding flexes, which may be in stainless steel, to the joints, or by using the so-called "pig tail" or "flexible loop", i.e., a loop on a pipe allowing it to deform.

Thus, it is possible to stretch out more than 10 m of jointed arm (the height of water in the pool) above the internal part.

The jointed arm(s) may be maneuvered by means of electrical motors or cylinders.

ADVANTAGES OF THE INVENTION

The invention suppresses all the bushings of the lid of the vessel and the bushings of the bottom of the vessel or of the lid of the vessel, which are absolutely necessary in a conventional nuclear reactor for providing all the connection, measuring, monitoring and control functions inside the reactor.

The internal part(s) described in this document may be parts added to the initially provided internal part in the vessel.

In any case, the internal part of the device according to the invention may very well provide the mechanical function preventing the core of the reactor and the fuel from being lifted by the flux of coolant fluid.

The invention may be applied to all types of reactor, whether they are reactors with pressurized water, with boiling water, with gas coolant, with molten metal, or even with heavy water. The use of control rods to be inserted between the fuel rods and of all the guiding devices of the latter found above the core and outside the vessel, may thereby be suppressed.

The channels may thereby be filled and emptied with several types of liquid neutron absorbers, such as metals or metal alloys, optionally added with neutron-absorbing solid neutron absorber particles of the same density as the metal or the alloy. The liquid neutron absorbers remain liquid at all the operating temperatures of a nuclear reactor, including those under accidental temperature conditions.

The subassembly of the device consisting inter alia of the assembly head, the liquid neutron absorber tanks and the injection channels, being provided at the same time as the fuel assemblies and below the operating temperature of the reactor, the injection channels are filled with the neutron-absorbing mixture which is now solid. This provides a considerable advantage, notably during the fuel transport and handling phases. This provides the device with a further safety level.

By positioning the helium tank inside the upper internal part, the latter may be made stable in temperature and forms a passive system entirely in the reactor. Indeed, injection of neutron absorber is performed in the case of failure of the piping external to the vessel.

The bell used for varying the spectrum may vary the neutron spectrum, which allows the fuel to be regenerated. When it is filled with the coolant fluid, an increased moderation of the flux is achieved which allows the fuel of the reactor, which has been regenerated, to be consumed, and thus extends the cycle of the fuel.

Other advantages relate to the loading of the core of the reactor provided with the control device according to the invention.

Indeed, once the fuel has been put inside the vessel of the reactor, the internal part 10B or the equivalent assembly is laid over the latter. The removable connection part 11 is then placed, the connectors connected to the outside being also connected to a pressurized gas supply, thereby preventing the passage of water. Indeed, as the removable connection part 11 is removable and provided with lids 19, water cannot therefore penetrate into this removable connection part 11.

By tightening the screw 14, it is possible to obtain a perfect seal on the internal part 10 or 10S. The bell 38 is put into communication with the tubes and conduits in the mobile connection part 11. Thus, the connection between the gas supply and the tanks 4A and 4B of liquid neutron absorber and the injection channels 7 is safely achieved, without having introduced any water into the circuit. Such a connection may moreover be monitored by measuring the gas leaks identified in the reactor. In the case of poor tightening, the operation may be resumed, the mobile connection part 11 changed, without having to remove internal parts used for supporting the fuel and the core of the reactor. This is an availability and safety advantage for upkeeping and maintaining the nuclear reactor.

By tightening the screw 14, it is possible to obtain a perfect seal on the internal part 10B or 10S. The bell 38 is put into communication with the tubes and conduits in the removable connection part 11. Thus, the connection between the gas supply and the tanks 4A and 4B of neutron-absorbing liquid and the injection channels 7 is safely achieved, without having introduced any water into the circuit. Such a connection may moreover be monitored by measuring the gas leaks identified in the reactor. In the case of poor tightening, the operation may be resumed, the removable connection part 11 changed, without having to remove internal parts used for supporting the fuel and the core of the reactor. This is an availability and safety advantage for upkeeping and maintaining the nuclear reactor.

It is possible to intervene on one or more control devices relative to one or more fuel assemblies.

On the other hand, the invention provides four different control functions in the operation of the reactors, which are:
stopping the reactor in an emergency with high speed for inserting the neutron-absorbing liquid;
monitoring the power of the operating reactor;
correcting flux deformations inside the core;
changing the neutron spectrum inside the core.

It is noted that the emergency stop is of the passive type.

With the invention it is also possible to dissociate the coolant fluid from the materials which are used for controlling the reactor. One thus gets rid of the chemical handling of the coolant fluid and of the drawbacks resulting from the presence of boric acid in the coolant circuits (corrosion).

Of course, any repair on the removable connection part 11 is possible, assembling by assembling the fuel, without having to remove the parts used for holding the fuel in place, i.e., the internal part.

With the invention, it is possible to multiply the number of control devices, without requiring a large number of passages through the wall of the vault of the reactor or the internal parts. With this multiplicity of control components it is possible to reduce dissymmetry of the neutron flux in an operating reactor.

By using the diaphragm 6 on the pneumatic circuit, the use of two circuits may be suppressed by generating a differential pressure between both branches of the tube 7.

By using one or more jointed arms, it is possible to transfer the connection point of the whole set of conduits connecting the core of the reactor to the outside of the pool.

The invention claimed is:
1. A nuclear reactor comprising:
a vessel divided into two discrete parts that are separate from one another;
a reactor core located in the vessel and containing fuel rod assemblies;

at least one internal structure being located within the vessel and having a flange portion extending between the two discrete parts of the vessel such that one of the two discrete parts is entirely separated from the other of the two discrete parts by the flange portion;

insertion means for inserting a neutron-absorbing liquid in said fuel rod assemblies, located in the vessel;

external control devices located outside the vessel and connected to said insertion means through a plurality of conduits located inside said flange portion of the internal structure; and said insertion means comprises a transmission means partly located in said conduits.

2. The nuclear reactor according to claim 1, wherein the neutron-absorbing liquid selected from the group consisting of a metal, a metal alloy, a metal with neutron-absorbing solid particles of a same density as the metal, and a metal alloy with neutron-absorbing solid particles of a same density as the metal alloy.

3. The nuclear reactor according to claim 1, wherein said internal structure is located above the core and the flange portion emerges on the outside of the vessel, laterally.

4. The nuclear reactor according to claim 1, further comprising at least one connection arm having a first end connected to said internal structure, said connection arm carrying conduits extending from said conduits located inside the flange portion of the internal structure, the connection arm being configured to assume:

a stretched-out connection position, in which a second end of the connection arm is connected to said external control devices outside a pool containing the vessel, and a folded position, in which the connection arm is folded inside said internal structure, transmission components being inside the connection arm.

5. The nuclear reactor according to claim 1, wherein the transmission means comprises a helium tank located in said internal structure.

6. The nuclear reactor according to claim 1, wherein said internal structure includes an upper internal part comprising said flange portion and a lower internal part located below the upper internal part, inside the vessel.

7. The nuclear reactor according to claim 1, wherein said internal structure comprises a single internal part comprising said flange portion.

8. The nuclear reactor according to claim 1, wherein the means for injecting said liquid neutron absorber comprises, for each fuel rod assembly, at least one tank of liquid neutron absorber located in said internal structure.

9. The nuclear reactor according to claim 8, further comprising an assembly head providing connection between said internal structure and said injection channels located in the fuel rod assemblies, said assembly head being located below the internal structure.

10. The nuclear reactor according to claim 9, wherein liquid neutron absorber conduits located in the assembly head connect said at least one tank of liquid neutron absorber with the injection channels, each liquid neutron absorber conduit being extended by a swan-neck.

11. The nuclear reactor according to claim 10, further comprising, for each fuel rod assembly, a removable connection part located above said internal structure to provide connections between the conduits located in the internal structure and said means for injecting said liquid neutron absorber, the removable connection part including a space, the conduits of the internal structure opening in said space, said removable connection part further comprising conduits connecting the conduits of the internal structure with liquid neutron absorber tanks of the injection means controlled by said external control devices, via said space.

12. The nuclear reactor according to claim 11, wherein for each fuel rod assembly, a removable bell and seals are located in the space of the removable connection part, above an end of the conduit of the internal structure.

13. The nuclear reactor according to claim 12, further comprising, for each fuel rod assembly, a pneumatic distribution circuit, the removable connection part including lids, at a base of the removable bell, these lids providing a sealed connection between the conduits of the internal structure, the conduits of the removable connection part and conduits of the assembly head.

14. The nuclear reactor according to claim 11, further comprising, for each fuel rod assembly, an electrical distribution circuit, the removable connection part including lids at a base of the removable bell, the removable connection part being sealably mounted by a joint in said removable bell and configured to receive a ball valve carried at an end of a cable mounted in said internal structure, said ball valve being received in the space of the removable connection part.

15. The nuclear reactor according to claim 10, wherein, for each fuel rod assembly, at least two neutron absorber conduits connecting tanks of the liquid neutron absorber and the injection channels are located in the assembly head, the tanks being arranged on at least two different levels.

16. The nuclear reactor according to claim 1, wherein injection channels are located inside the fuel rod assemblies, each injection channel including an external tube and at least one capillary tube located in said external tube.

17. The nuclear reactor according to claim 16, wherein the external tube has a portion of variable section over its height.

18. The nuclear reactor according to claim 17, wherein the variable section is located in the upper portion of the external tube.

19. The nuclear reactor according to claim 16, wherein at least one of the injection channels comprises a bell inside which the external tube is located.

20. The nuclear reactor according to claim 16, wherein the injection channels are parallel to each other.

21. The nuclear reactor according to claim 1, further comprising pistons actuating control rods located between the fuel rod assemblies, said pistons being controlled via conduits extending through said internal structure.

22. The nuclear reactor according to claim 1, further comprising electrical or electromagnetic devices actuating control rods located between the fuel rod assemblies, said electrical or electromagnetic devices being controlled via conduits extending through said internal structure.

23. The nuclear reactor according to claim 11, wherein at least two removable connection parts have complementary self-locking shapes.

24. The nuclear reactor according to claim 11, wherein said removable connection part has water holes with a partly helical profile.

25. The nuclear reactor according to claim 1 further comprising:

injection channels located inside the fuel rod assemblies; and connection means between said internal structure and said injection channels located inside the fuel rod assemblies, wherein the insertion means further comprises means for injecting said liquid neutron absorber into said injection channels, and wherein the means for injecting a neutron-absorbing liquid comprises at least one tank of neutron-absorbing liquid under said internal structure.

26. The nuclear reactor according to claim 25, wherein the connection means comprises an assembly head providing connection between said internal structure and said injection channels located in the fuel rod assemblies, said assembly head being located below the internal structure.

27. A nuclear reactor comprising:
a vessel;
a reactor core located in the vessel and containing fuel rod assemblies;
at least one internal structure located within the vessel and extending on a complete section of the reactor core;
means for controlling an instantaneous power of said reactor; and
means for ensuring emergency stopping of the reactor,
wherein said internal structure comprises a single portion emerging outside the vessel, the single portion entirely separating two discrete parts of the vessel from one another,
wherein said means for controlling instantaneous power of said reactor and said means for ensuring emergency stopping of said reactor include external control devices located outside the vessel, means for inserting a neutron-absorber in said fuel rod assemblies, and a plurality of conduits connecting said control devices to said inserting means through said single portion of the internal structure.

* * * * *